United States Patent Office 3,058,926
Patented Oct. 16, 1962

3,058,926
METHOD FOR MAKING SELF-EXTINGUISHING ALKENYL AROMATIC RESIN COMPOSITIONS COMPRISING INCORPORATING THEREIN AN ORGANIC BROMINE-CONTAINING COMPOUND AND AN ORGANIC PEROXIDE
Jacob Eichhorn, Midland, Mich., assignor to The Dow Chemical Company, Midland, Mich., a corporation of Delaware
No Drawing. Filed July 13, 1959, Ser. No. 826,389
20 Claims. (Cl. 260—2.5)

This invention concerns a method for making flame-proof alkenyl aromatic resin compositions, and pertains especially to foamable alkenyl aromatic resin granules suitable for the manufacture of flame-proof cellular articles. It relates more particularly to an improved method for incorporating organic flame-proofing agents, or volatile organic fluid foaming agents and organic flame-proofing agents, into granules of normally solid alkenyl aromatic resins, e.g. polystyrene.

In the manufacture of foamable alkenyl aromatic resin compositions, i.e. normally solid granules of an alkenyl aromatic resin having a volatile organic fluid such as pentane as foaming agent uniformly dispersed throughout, it is common practice to polymerize the monomer in admixture with the volatile organic fluid while having the materials dispersed or suspended in an inert liquid non-solvent medium such as water or brine, whereby the product is obtained in the form of beads or pearls.

It is also known to steep granules of an alkenyl aromatic resin, e.g. polystyrene, in a volatile organic fluid such as n-pentane or in admixture with n-pentane while having the resin granules suspended in an aqueous medium, to produce foamable particles of the polymer.

It has been proposed to make non-flammable or flame-resistant foamable styrene polymer compositions by polymerizing styrene in admixture with an organic bromine-containing compound such as styrene dibromide and a volatile foaming agent, e.g. pentane or petroleum ether.

The method heretofore proposed for making flame-resistant foamable styrene polymer compositions has not been entirely satisfactory for the reasons that many of the organic bromides suitable as flame-proofing agents have an action of retarding the rate of polymerization or of lowering the molecular weight of the polymer that is obtained, or both, which results in prolonged polymerization schedules, together with substantial change in molecular weight of the polymer, depending in part upon the kind and amount of the organic bromide employed as the flame-proofing agent.

It is a primary object of the invention to provide a method for making flame-proof alkenyl aromatic resin granules, particularly foamable alkenyl aromatic resins granules, which method is independent of the molecular weight of the polymer employed. Another object is to provide an improved method of incorporating volatile organic fluids and organic flame-proofing agents uniformly throughout granules of a normally solid alkenyl aromatic resin. Still another object is to provide a method for readily, rapidly and efficiently incorporating a volatile organic fluid foaming agent, together with an organic bromide and an organic peroxide as flame-proofing agents, into granules of a normally solid alkenyl aromatic resin, e.g. polystyrene, to produce a foamable organic polymer composition suitable for making a non-flammable cellular article. Other and related objects may appear from the following description of the invention.

According to the invention flame-resistant or non-flammable alkenyl aromatic resin granules, especially foamable alkenyl aromatic resin granules, are readily prepared by steeping or heating said granules in contact with an organic liquid comprising an organic polybromide and an organic peroxide, or in admixture with an organic liquid consisting essentially of a volatile organic fluid foaming agent, an organic polybromide and an organic peroxide, while having said materials dispersed or suspended in an inert liquid non-solvent medium such as water, brine or an aqueous solution of water and a minor proportion, e.g. 10 percent by weight or less, of a lower aliphatic alcohol, glycol or ketone. Surprisingly, the alkenyl aromatic resin granules readily absorb the organic liquid, e.g. the volatile organic fluid, the organic polybromide and the organic peroxide, to form alkenyl aromatic resin granules or foamable polymer compositions having the flame-proofing ingredients uniformly dispersed throughout. Moreover, the molecular weight of the alkenyl aromatic resin granules employed in the process is independent of the flame-proofing agents employed and foams prepared from the foamable resin granules of this invention are more homogeneous and have superior physical properties than have alkenyl aromatic resin foams that are prepared from foamable resin granules made by polymerizing the monomer in admixture with the organic polybromide and the foaming agent.

The alkenyl aromatic resins to be employed in the process can be any of the flammable normally solid thermoplastic homopolymers and copolymers of one or more monovinyl aromatic compounds having the general formula:

Ar—CH=CH$_2$ wherein Ar represents an aromatic radical of the group consisting of aromatic hydrocarbon and nuclear halogenated aromatic hydrocarbon radicals of the benzene series, copolymers of at least 70 percent by weight of one or more of such monovinyl aromatic compounds and not more than 30 percent by weight of another monomer such as acrylonitrile, methylmethacrylate or alpha-methyl styrene, copolymers of from 99.5 to 99.99 percent by weight of any one or more of such monovinyl aromatic compounds and from 0.5 to 0.01 percent of a divinyl aromatic hydrocarbon, e.g. divinylbenzene, divinyltoluene or divinylxylene, copolymers of from 90 to 99 percent by weight of one or more of such monovinyl aromatic compounds and from 10 to 1 percent of natural or a synthetic rubber such as rubbery copolymers of styrene and butadiene, rubbery copolymers of arcrylonitrile and butadiene, rubbery copolymers of methyl isopropenyl ketone and butadiene or rubbery copolymers of styrene, methyl isopropenyl ketone and butadiene, or polymeric compositions which are mechanical blends of such vinyl aromatic polymers with from 1 to 10 percent by weight of natural or a synthetic rubber.

The method is advantageously employed for making foamable compositions from the highly flammable homopolymers and copolymers of monovinyl aromatic compounds such as styrene, vinyltoluene, vinylxylene, isopropylstyrene, ethylvinylbenzene, chlorostyrene, dichlorostyrene, bromostyrene, fluorostyrene, tert.-butylstyrene, coplymers of at least 70 percent by weight of one or more of such monovinyl aromatic compounds and not more than 30 percent of another monomer such as acrylonitrile, methylmethacrylate or alpha-methyl styrene, copolymers of from 99.5 to 99.99 percent of one or more of such monovinyl aromatic compounds and from 0.5 to 0.01 percent of divinylbenzene and copolymers of from 90 to 99 percent by weight of one or more of such monovinyl aromatic compounds and from 10 to 1 percent of natural or a synthetic rubber, e.g. a rubbery copolymer of butadiene and styrene.

The organic bromide to be employed as the flame-proofing agent can be an organic bromine-containing compound having a plurality of bromine atoms in an aliphatic or a cycloaliphatic radical, the bromine atoms constituting about 45 percent by weight or more of the organic compound. Examples of suitable organic bromides are carbon tetrabromide,
tetrabromoethylene,
1,2,-dibromo-1,1,2,2-tetrachloroethane,
1,1,2,2-tetrabromoethane,
dibromodichloromethane,
1,2-dibromo-1,1-dichloroethane,
1,2,dibromo-1,2,2-tri-chloroethane,
1,2,3,4-tetrabromobutane,
1,2,3-tribromopropane,
pentabromoethane,
tetrabromopentane,
hexabromoethane,
hexabromocyclohexane,
pentabromomonochlorocyclohexane,
tetrabromodichlorocyclohexane,
tribromotrichlorocyclohexane,
1,2-di-(bromomethyl)benzene,
alpha,beta-dibromoethylbenzene and
tris(2,3-dibromopropyl)phosphate.

The bromochlorocyclohexane compounds can be prepared by reaction of chlorine and bromine with benzene under the influence of actinic radiation, e.g. ultraviolet light or sunlight, employing procedure similar to that described in Bull. Soc. Chim. (France), pages 118–121 (1949).

The organic bromide can be employed in amounts of from 0.2 to 10, preferably from 0.2 to 2, percent by weight of the polymer initially used, and is preferably employed in an amount less than is required alone to render the polymer non-flammable.

The organic peroxides to be employed as synergists in combination with the organic bromide self-extinguishing agents for enhancing the flame-proofing properties of the organic bromides are the relatively non-volatile organic peroxy compounds boiling at 100° C. or above at 760 millimeters absolute pressure and having a half-life of at least 2, preferably from 5 to 15 hours or longer as determined in benzene at 100° C., which organic peroxy compound contains at least 6 carbon atoms in the molecule and has at least one tertiary carbon atom attached to an oxygen atom of the peroxy group. Such peroxy compounds have the general formula:

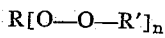

wherein R represents a member of the group consisting of alkyl radicals containing from 2 to 9 carbon atoms, aryl and aralkyl hydrocarbon radicals of the benzene series, the acetyl, the benzoyl, and the phthaloyl radical, R' represents a member of the group consisting of hydrogen, alkyl radicals containing from 2 to 9 carbon atoms, aryl and aralkyl hydrocarbon radicals of the benzene series, and $n$ is a whole number from 1 to 2.

Examples of such peroxy compounds are tert.-butyl peracetate, tert.-butyl perbenzoate, di-tert.-butyl diperphthalate, cumene hydroperoxide and di(alkyl)-, di(aralkyl)- and alkyl aralkyl peroxides having the formula:

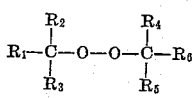

wherein $R_1$ and $R_6$ is a member of the group consisting of the methyl, ethyl and aryl hydrocarbon radicals of the benzene series, $R_2$ and $R_3$ is a member of the group consisting of alkyl radicals containing from 1 to 3 carbon atoms and aryl hydrocarbon radicals of the benzene series, and $R_4$ and $R_5$ is a member of the group consisting of hydrogen, alkyl radicals containing from 1 to 3 carbon atoms and aryl hydrocarbon radicals of the benzene series. The di(alkyl)-, di(aralkyl)- and alkyl aralkyl peroxides are preferred. Examples of such peroxides are cumyl ethyl peroxide,
di-tert.-butyl peroxide,
di-tert.-amyl peroxide,
cumyl tert.-butyl peroxide,
cumyl tert.-octyl peroxide,
cumyl isopropyl peroxide,
cumyl butyl peroxide,
dicumyl peroxide,
bis(alpha-methylbenzyl)peroxide,
bis(alpha-ethylbenzyl)peroxide,
bis(alpha-propylbenzyl)peroxide,
bis(alpha-isopropylbenzyl)peroxide,
bis(alpha,alpha-dimethylbenzyl)peroxide,
bis(alpha-methyl-alpha-ethylbenzyl)peroxide,
bis(alpha,alpha-diethylbenzyl)peroxide,
bis(alpha,alpha-di-propylbenzyl)peroxide,
bis(alpha,alpha-diisopropylbenzyl)peroxide,
bis(alpha,alpha-p-methylbenzyl)peroxide,
bis(alpha-methyl-alpha-ethyl-p-methylbenzyl)peroxide,
bis(alpha,alpha-diethyl-p-methylbenzyl)peroxide,
bis(alpha,alpha-diisopropyl-p-methylbenzyl)peroxide,
bis(alpha,alpha-dimethyl-p-ethylbenzyl)peroxide,
bis(alpha-methyl-alpha-ethyl-p-ethylbenzyl)peroxide,
bis(alpha,alpha-diethyl-p-ethylbenzyl)peroxide,
bis(alpha,alpha-diisopropyl-p-ethylbenzyl)peroxide,
bis(alpha,alpha-dimethyl-p-isopropylbenzyl)peroxide,
bis(alpha-methyl-alpha-ethyl-p-isopropylbenzyl)peroxide,
bis(alpha,alpha-diethyl-p-isopropylbenzyl)peroxide,
bis(alpha,alpha-diisopropyl-p-isopropylbenzyl)peroxide,
bis(alpha,alpha-dimethyl-p-tert.-butylbenzyl)peroxide,
bis(alpha-methyl-alpha-ethyl-p-tert.-butylbenzyl)peroxide,
bis(alpha,alpha-diethyl-p-tert.-butylbenzyl)peroxide,
bis(alpha,alpha-diisopropyl-p-tert.-butylbenzyl)peroxide,
bis(alpha,alpha,dimethyl-p-pentamethylethylbenzyl)-
  peroxide,
bis(alpha-methyl-alpha-ethyl-p-pentamethylethylbenzyl)-
  peroxide,
bis(alpha,alpha-diethyl-p-pentamethylethyl-benzyl)peroxide,
bis(alpha,alpha-diethyl-p-pentamethylbenzyl)peroxide.
bis(alpha,alpha-diisopropyl-p-pentamethylethylbenzyl)-
  peroxide and
bis(triphenylbenzyl)peroxide.

The minimum proportions of the organic bromide and the organic peroxide to be employed to produce non-flammable alkenyl aromatic resin compositions will vary somewhat depending in part upon the organic bromide used and the polymer employed, since the alkenyl aromatic resins vary in their burning characteristics or flammability and the organic bromides differ among themselves as regards their flame-retarding action.

The invention is advantageously employed in making foamable alkenyl aromatic resin granules suitable for the manufacture of non-flammable cellular articles wherein a mass or body of the granules are foamed in a porous mold to produce a cellular article having a predetermined shape by heating the foamable granules at temperatures above the boiling point of the volatile organic fluid and above the softening point of the polymer such that vapors of the volatile organic fluid expand the heat-softened polymer to produce a cellular mass.

Volatile organic fluids which can be employed as foaming agents for the alkenyl aromatic resin are non-solvents for the polymer such as saturated aliphatic hydrocarbons containing from 4 to 7 carbon atoms in the molecule or perchlorofluorocarbons, which volatile organic compound has a molecular weight of at least 58 and a boiling point not higher than 95° C. at 760 millimeters absolute pressure. Examples of suitable organic compounds are n-pentane, isopentane, neopentane, n-butane, isobutane, hexane, heptane, petroleum ether or perchlorofluorocarbons having the structural formulae:

$$CCl_3F$$
$$CCl_2F_2$$
$$CClF_3$$
$$CCl_2F—CCl_2F$$
$$CClF_2—CCl_2F$$
$$CClF_2—CClF_2$$
$$CF_3—CClF_2$$

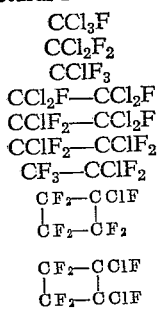

Mixtures of any two or more of such volatile organic compounds can also be used. The foaming agent can be employed in amounts corresponding to from 0.05 to 0.3 gram molecular proportion of the volatile organic compound per 100 grams of the polymer initially used.

The method can be employed to make flame-proof foamable granules of the alkenyl aromatic resins by steeping or heating the resin granules in a liquid body of the volatile organic compound containing the organic bromide alone or together with the organic peroxide in proportions such that the resin granules are impregnated with an amount of said materials in proportions within the ranges herein specified, the invention is advantageously and economically employed by suspending the resin granules in an inert aqueous liquid medium such as water or brine in a pressure-resistant vessel and adding thereto the foaming agent, the organic bromide and the organic peroxide in about the proportions desired in the final product, heating the mixture with agitation to temperatures between about 60° and 150° C. preferably from 60° to 125° C. for a period of from about 5 minutes up to 4 hours, preferably from 0.25 to 2 hours, then cooling the mixture to a temperature of about 40° C. or below, e.g. 20° C., and releasing the pressure and separating the impregnated resin granules from the liquid. Surprisingly, it has been found that a predominant amount, e.g. 50 percent or more, of the added ingredients are readily, rapidly and uniformly incorporated throughout the resin granules. For optimum rate of absorption of said materials in the resin granules the alkenyl aromatic resin granules should be comminuted to a fine particle size, e.g. of sizes not greater than 10 mesh per inch as determined by U.S. Standard Screens. Where the alkenyl aromatic resin is prepared in bead or granular form by a suspension polymerization process, the volatile organic compound, and the flame-proofing agent or agents can be added to the polymerization vessel at the end of the polymerization with continued agitation and heating to produce the non-flammable foamable beads or granules of the resin. It may be mentioned that best results are obtained by polymerizing the monomers in a suspension process, together with a portion of the desired amount of the foaming agent to obtain polymer beads, then adding a further amount of the same or another of the volatile organic compounds, together with the organic bromide and the organic peroxide in the desired amounts, to the polymerization vessel with continued agitation to produce the non-flammable resin granules. The presence of a portion of the volatile organic compound uniformly dispersed in the resin granules has an action of facilitating the incorporating of the organic bromide and the organic peroxide throughout the polymer.

Alternatively, the polymer granules can be prepared by polymerizing the monomers, together with the organic peroxide, e.g. dicumyl peroxide, required in the final product for enhancing the flame-proofing properties of the organic bromide, and a portion ranging from about 25 percent to 75 percent of the volatile organic foaming agent desired in the final product, in an aqueous suspension process at temperatures between about 60° and 150° C. employing any of the usual polymerization catalysts such as benzoyl peroxide or lauroyl peroxide, to initiate the polymerization reaction, and thereafter adding to the polymerization vessel, the remaining portion of the volatile organic compound and the organic bromide, together with, or without, a further amount of the organic peroxide required in the final product, and continuing the agitation and heating to impregnate said materials into the preformed polymer beads containing the relatively stable peroxide and a portion of the foaming agent, after which the mixture is cooled to a temperature of 40° C. or below under the autogenous pressure of the mixture of the materials, and the polymer granules are separated from the liquid and washed and dried.

It is important that the alkenyl aromatic resin beads or granules be heated in contact with a liquid comprising at least one of the agents, the organic bromide and/or the volatile organic compound, and that the organic bromide flame-proofing agent and the organic peroxide for enhancing the flame-proofing action of said organic bromide be uniformly and intimately dispersed throughout the resin granules in order to obtain foamable polymer compositions suitable for making self-extinguishing cellular articles.

In practice, the organic liquid to be absorbed by the resin granules, i.e. the organic bromide and the peroxide or the volatile organic fluid foaming agent, the organic bromide and the organic peroxide, can readily be incorporated with the alkenyl aromatic resin beads or granules by suspending the resin granules in an inert liquid medium, preferably water or brine, which is a non-solvent for the resin and said agents, and heating the mixture under a pressure at least as great as the autogenous pressure of the mixture of the materials at temperatures between about 60° and 150° C., preferably from 60° to 125° C., for a period of from about 5 minutes up to 4 hours or longer, after which the mixture is cooled to a temperature of 40° C. or below, preferably to 20°–30° C. and the resin granules are separated from the liquid and washed and dried.

In the instance where the organic bromide is a liquid at the steeping temperature employed, the starting resin granules can contain all or a part of the organic peroxide, or all or a part of the volatile organic foaming agent, or both, desired in the final product. By heating said resin granules in contact with the liquid organic bromide under the conditions described herein, equally as good results are obtained. In the instance where the organic bromide is a solid or crystalline material at the temperatures employed, the method is advantageously carried out by heating the resin granules, containing, or not containing, the organic peroxide, in contact with a liquid comprising the organic bromide, at least a portion of the volatile organic fluid foaming agent and/or the organic peroxide.

Small amounts, e.g. from 0.1 to 5 percent by weight based on the weight of the polymer, of oil soluble dyes, plasticizers or flow agents such as Quinizarin Green Base, butyl stearate or white mineral oil, can be added to the suspension and said materials incorporated with the foamable polymer granules, but such additives are not required, although they can advantageously be incorporated with the polymer by the method of the invention.

The following examples illustrate ways in which the principle of the invention has been applied, but are not to be construed as limiting its scope.

EXAMPLE 1

A charge of 20 pounds of polystyrene having a viscosity characteristic of 30 centipoises as determined for a 10 weight percent solution of the polystyrene in toluene at 25° C., and in the form of beads of sizes between 20 and 30 mesh per inch as determined by U.S. Standard Screens, was suspended in 20 pounds of water containing 82.5 grams of (55 percent active) methyl cellulose of 1500 cps. (aqueous 2 weight percent solution) as suspending agent. The mixture was placed in a pressure-resistant vessel and agitated. A charge of 2.1 pounds of a solution consisting of 1.8 pounds of n-pentane, 0.2 pound of 1,2-dibromo-1,1,2,2-tetrachloroethane and 0.1 pound of dicumyl peroxide, i.e. 9 percent, 1 percent and 0.5 percent, respectively, of each of said ingredients, based on the weight of the polystyrene, was added. The vessel was closed and was filled with nitrogen was to a pressure of 80 pounds per square inch gauge pressure. Thereafter, the mixture was heated at a temperature of 95° C. for a period of 4 hours then was cooled to a temperature of about 25° C. The pressure was released and the polystyrene beads were separated from the aqueous liquid and were washed and dried at a temperature of 40° C. The product was analyzed and found to contain 5.1 percent by weight of n-pentane and 0.68 percent by weight of 1,2-dibromo-1,1,2,2-tetrachloroethane. A portion of the product was placed in water having a temperature of 95° C. for a period of 3 minutes. The pre-foamed material was placed in a perforated mold and was heated with steam for 5 minutes at 110° C., then cooled, to form a cellular board of 1 x 10 inches cross-section by 16 inches long. Test pieces, free of outer or continuous surface, of ¼ x 1 inch cross section by 6 inches long were cut from the foamed board. These test pieces were used to determine the burning or self-extinguishing characteristics of the foam. The procedure for carrying out the test was to hold a test piece of the foam in a fixed horizontal position with the 1 inch width vertical, then move a microburner with a 1 inch flame under the free end of the test piece so that the tip of the flame contacts the lower ¼ inch wide edge of the test piece and ignites the same. The flame is then removed and the test piece observed for burning. The foam prepared from the composition had a density of 1.5 pounds per cubic foot and was self-extinguishing in 1.4 seconds.

Similar results were obtained by employing 1 percent by weight of pentabromomonochlorocyclohexane in place of the 1,2-bromo-1,1,2,2-tetrabromoethane employed in the example. The foamed product was self-extinguishing in 1.5 seconds.

EXAMPLE 2

In each of a series of experiments, a granular polystyrene similar to that employed in Example 1 was impregnated with a solution of n-pentane or dichlorodifluoromethane, as foaming agent 1,2-dibromo-1,1,2,2-tetrachloroethane and dicumyl peroxide, in proportions and kind as stated in the following table, based on the weight of the polystyrene initially used, by procedure similar to that described in the preceding example. Portions of the product were foamed and tested for self-extinguishing characteristics as described in Example 1. Table I identifies the experiments and gives the percent by weight of n-pentane, organic bromide and dicumyl peroxide employed, based on the weight of the polystyrene beads. The table also gives the impregnating time and temperature, and the percent by weight of n-pentane or dichlorofluoromethane foaming agent and organic bromide in the product. The table gives the self-extinguishing time in seconds for a cellular test piece of the foamed product.

Table I

| Run No. | Starting Materials | | | | Impregnating Conditions | | Foamable Granules | | Foamed Product |
|---|---|---|---|---|---|---|---|---|---|
| | Polystyrene, Parts | Foaming Agent, Percent | Organic Bromide, Percent | Dicumyl Peroxide, Percent | Time, Hrs. | Temp., °C. | n-Pentane, Percent | Organic Bromide, Percent | Self-Extinguishing Time, Sec. |
| 1 | 100 | 9 | 0.25 | 0.5 | 4 | 95 | 4.8 | 0.29 | 2.1 |
| 2 | 100 | 9 | 0.5 | 0.5 | 4 | 95 | 6.0 | 0.55 | 1.5 |
| 3 | 100 | 9 | 1.0 | 0.5 | 4 | 95 | 6.0 | 0.82 | 1.5 |
| 4 | 100 | 9 | 1.0 | 0.25 | 4 | 95 | 4.7 | 0.69 | 2.9 |
| 5 | 100 | a 30 | 1.0 | 0.5 | 4 | 95 | 5.0 | 0.51 | 4.3 |
| 6 | 100 | 9 | 1.0 | 0.5 | 5 min. | 95 | 5.2 | 0.80 | 2.0 |
| 7 | 100 | b 9 | 1.0 | 0.5 | 2 | 95 | 6.5 | 0.71 | c 1.0 | a This foaming agent was dichlorodifluoromethane. All of the other runs employed n-pentane as the foaming agent.
b The pentane contained 10 percent by weight of Quinizarin Green Base Dye.
c The foamed product was a mottled blue-green color.

EXAMPLE 3

In each of a series of experiments, a charge of a batch of granular polystyrene in the form of beads of sizes between 20 and 30 mesh per inch as determined by U.S. Standard Screens, and containing 6.5 percent by weight of n-pentane was suspended in an equal weight of an aqueous medium similar to that employed in Example 1, in a pressure resistant vessel. A solution consisting of n-pentane, 1,2-dibromo-1,1,2,2-tetrachloroethane or 1,1,2,2-tetrabromoethane and dicumyl peroxide in amounts based on the weight of the polystyrene starting material as stated in the following table, was added. Thereafter, the mixture was heated in the closed vessel with stirring at a temperature of 95° C. for a period of time as stated in the table. The mixture was then cooled to room temperature and the polymer granules were separated from the liquid and dried. A portion of the impregnated polystyrene beads was foamed and the foam tested for self-extinguishing characteristics, employing procedure similar to that employed in Example 1. Table II identifies the experiments and gives the results obtained.

Table II

| Run No. | Starting Materials | | | | Impregnating Conditions | | Foamable Granules | | Foamed Product | |
|---|---|---|---|---|---|---|---|---|---|---|
| | Polystyrene Beads, Parts | n-Pentane, Parts | Organic Bromide, Parts | Dicumyl Peroxide, Parts | Time, Hrs. | Temp., °C. | n-Pentane, Percent | Organic Bromide, Percent | Density, lbs./cu. ft. | Self-Extinguishing Time, Sec. |
| 1 | 100 | 2.5 | 1 | 0.5 | 1 | 95 | 5.6 | 0.78 | 1.7 | 2.0 |
| 2 | 100 | 2.5 | 1 | 0.5 | 2 | 95 | 5.7 | 0.80 | 1.5 | 1.6 |
| 3 | 100 | 2.5 | 1 | 0.5 | 3 | 95 | 5.1 | 0.73 | 2.2 | 1.5 |
| 4 | 100 | 2.5 | 1 | 0.25 | 4 | 95 | 6.8 | 0.75 | 2.3 | 4.4 |
| 5 | 100 | 2.5 | 1 | 0.50 | 4 | 95 | 6.6 | 0.74 | 1.8 | 3.5 |
| 6 | 100 | 2.5 | 0.5 | 0.50 | 4 | 95 | 6.7 | 0.51 | 1.3 | 4.2 |
| 7 | 100 | 2.5 | 1 0.5 | 0.5 | 4 | 80 | 5.5 | 0.43 | | 4.0 |
| 8 | 100 | 2.5 | 1 | 0.5 | 0.5 | 125 | 7.5 | 0.51 | | 2.4 |

1 The organic bromide was 1,1,2,2-tetrabromoethane.

EXAMPLE 4

In each of a series of experiments, a charge of a batch of granular polystyrene in the form of beads of sizes between 20 and 30 mesh per inch, containing 4 percent by weight of n-pentane was suspended in an aqueous medium and heated in contact with 1,2-dibromo-1,1,2,2-tetrachloroethane or monochloropentabromocyclohexane and a further quantity of n-pentane, with or without dicumyl peroxide in amounts and kind as stated in the following table, employing procedure similar to that employed in Example 3. Table III identifies the experiments and gives the results obtained.

Table III

| Run No. | Starting Materials | | | | Impregnating Conditions | | Foamable Granules | | Foamed Product | |
|---|---|---|---|---|---|---|---|---|---|---|
| | Polystyrene Beads, Parts | Added n-Pentane, Parts | Organic Bromide, Parts | Dicumyl Peroxide, Parts | Time, Hrs. | Temp., °C. | n-Pentane, Percent | Organic Bromide, Percent | Density, lbs./cu. ft. | Self-Extinguishing Time, Sec. |
| 1 | 100 | 5 | 0.5 | 0 | 2 | 95 | 6.1 | 0.41 | 1.7 | Burns |
| 2 | 100 | 5 | 0.5 | 0.25 | 2 | 95 | 6.5 | 0.49 | | 3.1 |
| 3 | 100 | 5 | 0.5 | 0.50 | 4 | 95 | 6.7 | 0.47 | | 2.6 |
| 4 | 100 | 5 | 0.5 | 0.25 | 0.5 | 95 | 5.8 | 0.49 | | 1.8 |
| 5 | 100 | 5 | 0.5 | 0.25 | 4 | 95 | 6.9 | 0.43 | | 2.5 |
| 6 | 100 | 5 | ¹ 1.0 | 0.50 | 4 | 95 | 5.6 | 0.68 | | 1.3 |

¹ The organic bromide was monochloropentabromocyclohexane.

EXAMPLE 5

In each of a series of experiments, a charge of a batch of granular polystyrene in the form of beads of sizes between 20 and 30 mesh per inch was suspended in an aqueous medium similar to that employed in Example 1, in a pressure resistant vessel. A solution consisting of n-pentane, 1,2-dibromo-1,1,2,2-tetrachloroethane and an organic peroxide in amount and kind as stated in the following table, was added. The resulting mixture was heated with stirring in the closed vessel at a temperature of 95° C. for 4 hours, then was cooled to room temperature. The pressure was released and the polystyrene beads were separated from the liquid and dried. A portion of the impregnated beads was foamed and tested for self-extinguishing characteristics employing procedure similar to that employed in Example 1. Table IV identifies the experiments, names the organic peroxide used and gives the results obtained.

Table IV

| Run No. | Starting Materials | | | | | Foamed Product |
|---|---|---|---|---|---|---|
| | Polystyrene Beads, Parts | n-Pentane, Parts | Organic Bromide, Parts | Organic Peroxide | | Self-Extinguishing Time, Sec. |
| | | | | Kind | Parts | |
| 1 | 100 | 5 | 1 | Dicumyl Peroxide | 0.5 | 1.1 |
| 2 | 100 | 5 | 1 | Di-tert.-butyl Peroxide | 0.5 | 1.5 |
| 3 | 100 | 5 | 1 | Di-tert.-butyl diperphthalate | 1.0 | 1.0 |
| 4 | 100 | 5 | 1 | Di-tert.-butyl peracetate | 1.0 | 2.0 |
| 5 | 100 | 5 | 1 | Di-tert.-butyl perbenzoate | 1.0 | 2.0 |

EXAMPLE 6

A charge of 100 parts by weight of a solid copolymer of 99.93 percent by weight of styrene, 0.03 percent of ethylvinylbenzene and 0.04 percent of divinylbenzene, in the form of beads of sizes between 20 and 30 mesh per inch, containing 7.2 percent by weight of n-pentane as foaming agent, which copolymer beads were prepared by polymerizing the monomer in an aqueous suspension system under pressure in admixture with the pentane at temperatures between 90° and 110° C., then cooling the mixture to 25° C. and separating the copolymer beads containing the pentane, was suspended in an equal weight of an aqueous medium similar to that employed in Example 1. A charge of 1 percent by weight of 1,2-dibromo-1,1,2,2-tetrachloroethane and 0.5 percent by weight of dicumyl peroxide, each based on the weight of the copolymer, was added. The resulting mixture was heated in a closed vessel with stirring at a temperature of 95° C. for 4 hours, then was cooled to 30° C. and the copolymer beads separated from the liquid and dried. A portion of the impregnated beads were foamed and the foam tested for self-extinguishing properties employing procedures similar to those described in Example 1. The impregnated beads were analyzed and found to contain 4.7 percent by weight of n-pentane foaming agent, 0.25 percent of 1,2-dibromo-1,1,2,2,-tetrachloroethane self-extinguishing agent and approximately 0.5 percent of dicumyl peroxide. The foam produced from the beads had a density of 1.9 pounds per cubic foot of the foam, and was self-extinguishing in 1.3 seconds as determined by test.

EXAMPLE 7

A solid copolymer of 95 percent by weight of styrene and 5 percent of a rubbery copolymer of approximately 76.5 percent by weight of butadiene and 23.5 percent of styrene, prepared by dissolving the rubber in monomeric styrene and heating the solution in mass to polymerize the monomer, was fed to a plastics extruder wherein it was heated at temperatures between about 170–180° C. and was mixed with 5 percent by weight of n-pentane, then was extruded as a plurality of strands and was rapidly cooled and cut into segments of 0.05 inch diameter by about 0.065 inch long. The copolymer granules contained 4.8 percent by weight of n-pentane. A charge of 100 parts by weight of the copolymer granules was suspended in an aqueous medium similar to that employed in Example 1, and was heated under pressure with stirring in contact with 9 parts by weight of added n-pentane, 8 parts by weight of 1,2-dibromo-1,1,2,2-tetrachloroethane and 1 part of dicumyl peroxide at a temperature of 95° C. for a period of 4 hours. Thereafter, the mixture was cooled to 20° C. and the pressure was released. The copolymer granules were separated from the aqueous liquid and were dried. The impregnated copolymer granules contained 10.5 percent by weight of n-pentane and 4.4 percent of 1,2-dibromo-1,1,2,2-tetrachloroethane. A portion of the impregnated copolymer granules containing said agents and the dicumyl peroxide were foamed and the foam tested for self-extinguishing properties, employing procedures similar to those employed in Example 1. The foamed product was self-extinguishing in 12 seconds and had a density of about 5 pounds per cubic foot of the foam.

EXAMPLE 8

A charge of 376 pounds of monomeric styrene together with 0.225 percent by weight of benzoyl peroxide as polymerization catalyst, and 24 pounds of a commercial grade pentane as foaming agent was placed in a pressure resistant vessel in admixture with an approximately equal weight of an aqueous solution containing a small amount of a water-soluble sodium salt of sulfonated polyvinyltoluene as suspending agent. The mixture was stirred and was heated in the closed vessel to polymerize the monomer under time and temperature conditions as follows: 16 hours at 82° C.; 2 hours at 98° C.; and 6 hours at 120° C. Thereafter, the mixture was cooled to 95° C. A solution of 40 pounds of water containing 1 percent by weight of methyl cellulose, and a solution of 11.3 pounds of the commercial grade pentane, 2 pounds of 1,2-dibromo-1,1,2,2-tetrachloroethane and 2 pounds of dicumyl peroxide, were added by pumping said solutions in succession into the vessel. The resulting mixture was stirred and maintained at a temperature of 95° C. for a period of 2 hours, then was cooled to 20° C. The pressure was released. The polystyrene beads were separated from the aqueous liquid and were washed and dried. A portion of the beads were foamed and tested for self-extinguishing properties employing procedures similar to those described in Example 1. The foam was self-extinguishing in 1.5 seconds.

EXAMPLE 9

A charge of 100 parts by weight of polystyrene in the form of molding granules was suspended in 100 parts of an aqueous solution similar to that employed in Example 1. One part by weight of 1,2-dibromo-1,1,2,2-tetrachloroethane and 0.5 part of dicumyl peroxide was added. The resulting mixture was stirred and heated in a closed vessel at a temperature of 95° C. for a period of 15 minutes, then was cooled. The polystyrene granules were separated by filtering and were washed and dried. The polystyrene granules were analyzed and found to contain 0.47 percent by weight of the 1,2-dibromo - 1,1,2,2, - tetrachloroethane self - extinguishing agent. A portion of the impregnated granules were compression molded at a temperature of 160° C. under 650 pounds per square inch gauge pressure for a time of one minute to form a flat plate one-eighth inch thick. The molded plate was ignited in a flame and was found to be self-extinguishing when removed from the flame.

In contrast, when the experiment was repeated without the dicumyl peroxide, the molded plate of polystyrene burned.

Similar results are obtained by substituting any of the organic bromine-containing compounds, the organic peroxides or the volatile organic fluids herein specified for those employed in the foregoing specific examples provided that said materials are employed in accordance with the method of the invention as particularly pointed out and defined in the following claims.

I claim:

1. A method for making a self-extinguishing polymer composition which comprises (1) heating discrete particles of a flammable thermoplastic alkenyl aromatic resin of the group consisting of (a) homopolymers and copolymers of at least 70 percent by weight of at least one monovinyl aromatic compound having the general formula $Ar-CH=CH_2$ wherein Ar represents an aromatic radical of the group consisting of aromatic hydrocarbon and nuclear halogenated aromatic hydrocarbon radicals of the benzene series wherein the vinyl group is directly attached to a carbon atom of the aromatic nucleus and not more than 30 percent by weight of a monomer selected from the group consisting of acrylonitrile, methylmethacrylate and alpha-methylstyrene, (b) copolymers of from 99.5 to 99.99 percent by weight of at least one such monovinyl aromatic compound and from 0.5 to 0.01 percent by weight of a divinyl aromatic hydrocarbon of the benzene series and (c) polymer compositions consisting of from 90 to 99 percent by weight of at least one such monovinyl aromatic compound and from 10 to 1 percent by weight of a rubber of the group consisting of natural rubber and synthetic rubbers which are soluble in monomeric styrene, said particles of said alkenyl aromatic resin containing (A) from 0 to 0.3 gram molecular proportion of a volatile organic compound of the group consisting of saturated aliphatic hydrocarbons and perchlorofluorocarbons having a molecular weight of at least 58 and boiling at temperatures below 95° C. at 760 millimeters absolute pressure, (B) from 0 to 10 percent by weight of an organic bromine-containing compound having a plurality of bromine atoms in a radical of the group consisting of aliphatic and cyclo-aliphatic radicals, said bromine constituting at least 45 percent by weight of the molecule, and (C) from 0 to 2 percent by weight of an organic peroxide boiling at temperatures above 100° C. at 760 millimeters absolute pressure, having a half life of at least 2 hours at 100° C. as determined in benzene, containing at least 6 carbon atoms in the molecule, having at least one tertiary carbon atom attached to an oxygen atom of the peroxy group and having the general formula:

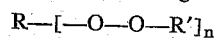

wherein R represents a member of the group consisting of alkyl radicals containing 2 to 9 carbon atoms, aryl and aralkyl hydrocarbon radicals of the benzene series and the acetyl, the benzoyl and the phthaloyl radical, R' represents a member of the group consisting of alkyl radicals containing from 2 to 9 carbon atoms and aryl and aralkyl hydrocarbon radicals of the benzene series, and $n$ is a whole number from 1 to 2, the proportions of said ingredients A, B and C being based on 100 grams of said alkenyl aromatic resin, and being present in said starting resin particles in total amount less than the sum of the maximum proportions stated, such that the resin granules are heated (2) in contact with an organic liquid comprising at least one of said ingredients (A), (B) and (C) in amount such that the mixture as a whole contains at least 0.2 percent by weight of the organic bromine-containing compound (B) and at least 0.1 percent by weight of the organic peroxide (C), while (3) having said resin particles and said organic liquid suspended in an inert predominantly aqueous non-solvent liquid medium containing not more than 10 percent by weight of organic solute at temperatures between 60° and 150° C. under a pressure at least as great as the autogenous pressure of the mixture of the materials at the temperature employed, whereby the resin particles adsorb said organic liquid to produce resin particles containing from 0 to 0.3 gram molecular proportion of the volatile organic compound (A), from 0.2 to 10 percent by weight of the organic bromine-containing compound (B) and from 0.1 to 2 percent by weight of the organic peroxide (C), per 100 grams of the resin, (4) cooling the resulting mixture to a temperature below 40° C. and (5) separating the impregnated resin particles from the aqueous suspending medium.

2. A method as claimed in claim 1, wherein the alkenyl aromatic resin is polystyrene.

3. A method as claimed in claim 1, wherein the alkenyl aromatic resin is a copolymer of styrene and from 0.5 to 0.01 percent by weight of divinylbenzene.

4. A method as claimed in claim 1, wherein the alkenyl aromatic resin is a copolymer of styrene and from 1 to 10 percent by weight of a rubbery copolymer of butadiene and styrene that is soluble in monomeric styrene.

5. A method as claimed in claim 1, wherein the organic peroxide (C) is tert.-butyl peracetate.

6. A method as claimed in claim 1, wherein the organic peroxide (C) is tert.-butyl perbenzoate.

7. A method as claimed in claim 1, wherein the organic peroxide (C) is di-tert.-butyl diperphthalate.

8. A method as claimed in claim 1, wherein the organic peroxide (C) is di-tert.-butyl peroxide.

9. A method as claimed in claim 1, wherein the organic peroxide (C) is dicumyl peroxide.

10. A method as claimed in claim 1, wherein the volatile organic compound (A) is at least one saturated aliphatic hydrocarbon having from 4 to 7 carbon atoms in the molecule.

11. A method as claimed in claim 1, wherein the volatile organic compound (A) is a perchlorofluorocarbon.

12. A method as claimed in claim 1, wherein the organic bromine-containing compound (B) is 1,2-dibromo-1,1,2,2-tetrachloroethane.

13. A method as claimed in claim 1, wherein the organic bromine-containing compound (B) is 1,1,2,2-tetrabromoethane.

14. A method as claimed in claim 1, wherein the organic bromine-containing compound (B) is mono-chloropentabromocyclohexane.

15. A method as claimed in claim 1, wherein the alkenyl aromatic resin is polystyrene, the volatile organic compound (A) is predominantly a saturated aliphatic $C_5$ hydrocarbon, the organic bromine-containing compound (B) is 1,2-di-bromo-1,1,2,2-tetrachloroethane and the organic peroxide (C) is dicumyl peroxide.

16. A method for making a foamable self-extinguishing polymer composition which comprises heating discrete particles of polystyrene in contact with an organic liquid consisting essentially of a predominant amount of (A) at least one saturated aliphatic $C_5$ hydrocarbon, (B) an organic bromine-containing compound having a plurality of bromine atoms in a radical of the group consisting of aliphatic and cyclo-aliphatic radicals, said bromine constituting at least 45 percent by weight of the molecule, and (C) dicumyl peroxide, while having said resin particles and said organic liquid suspended in an inert predominantly aqueous non-solvent liquid medium containing not more than 10 percent by weight of organic solute at temperatures between 60° and 125° C. under a pressure at least as great as the autogenous pressure of the mixture of the materials at the temperature employed, the proportions of said ingredients (A), (B) and (C) being such that the resin particles absorb said organic liquid with resultant formation of resin particles containing from 0.05 to 0.3 gram molecular proportion of the ingredient (A), from 0.2 to 10 percent by weight of the ingredient (B) and from 0.1 to 2 percent of the ingredient (C), per 100 grams of the resin, cooling the mixture to a temperature below 40° C. and separating the impregnated resin particles from the aqueous suspending medium.

17. A method as claimed in claim 16, wherein the alkenyl aromatic resin is polystyrene and the organic bromine-containing compound is 1,2-dibromo-1,1,2,2-tetrachloroethane.

18. A method as claimed in claim 16, wherein the alkenyl aromatic resin is polystyrene and the organic bromine-containing compound is 1,1,2,2-tetrabromoethane.

19. A method as claimed in claim 16, wherein the alkenyl aromatic resin is polystyrene and the organic bromine-containing compound is mono-chloropentabromocyclohexane.

20. A method as claimed in claim 16, wherein the organic liquid contains from 0.1 to 5 percent based on the weight of the polymer of an oil soluble dye.

References Cited in the file of this patent

UNITED STATES PATENTS

| | | |
|---|---|---|
| 2,520,429 | Park et al. | Aug. 29, 1950 |
| 2,658,877 | Dreisbach et al. | Nov. 10, 1953 |
| 2,676,927 | McCurdy et al. | Apr. 27, 1954 |
| 2,744,291 | Stastny et al. | May 8, 1956 |
| 2,760,947 | Werkema et al. | Aug. 28, 1956 |
| 2,848,428 | Rubens | Aug. 19, 1958 |